United States Patent
Hock (10) Patent No.: US 10,879,720 B2
(45) Date of Patent: Dec. 29, 2020

(54) BALANCING CIRCUIT FOR AN ELECTRICAL ENERGY STORAGE DEVICE

(71) Applicant: AVX Corporation, Fountain Inn, SC (US)

(72) Inventor: Joseph M. Hock, Surfside Beach, SC (US)

(73) Assignee: AVX Corporation, Fountain Inn, SC (US)

(*) Notice: Subject to any disclaimer, the term of this patent is extended or adjusted under 35 U.S.C. 154(b) by 18 days.

(21) Appl. No.: 16/038,397

(22) Filed: Jul. 18, 2018

(65) Prior Publication Data
US 2019/0027942 A1  Jan. 24, 2019

Related U.S. Application Data (60) Provisional application No. 62/535,515, filed on Jul. 21, 2017.

(51) Int. Cl.
 *H02J 7/00* (2006.01)
 *H02M 3/155* (2006.01)
 *H02J 7/34* (2006.01)

(52) U.S. Cl.
 CPC ............ *H02J 7/008* (2013.01); *H02J 7/0016* (2013.01); *H02J 7/0068* (2013.01);
 (Continued)

(58) Field of Classification Search
 CPC .......... H02J 7/008; H02J 7/0068; H02J 7/345; H02J 7/0016; H02J 2007/005; H02J 50/12;
 (Continued)

(56) References Cited

U.S. PATENT DOCUMENTS 6,480,368 B1   11/2002  Lammers et al.
6,738,242 B1    5/2004  Okamura et al.
(Continued)

FOREIGN PATENT DOCUMENTS

EP    2 337 182 A2    6/2011
JP    H 0945490 A     2/1997
(Continued)

OTHER PUBLICATIONS

PCT International Search Report and Written Opinion for corresponding PCT Application No. PCT/US2018/042624, dated Oct. 18, 2018, 11 pages.
(Continued)

*Primary Examiner* — Drew A Dunn
*Assistant Examiner* — Sailesh Thapa
(74) *Attorney, Agent, or Firm* — Dority & Manning, P.A.

(57) ABSTRACT

Balancing circuits for an ultracapacitor module are provided. In some implementations, the balancing circuit can include a regulator having an input. The regulator can be configured to compare an input voltage associated with the ultracapacitor received at the input to a reference voltage and to provide an output via an output node. The balancing circuit can further include a switching circuit coupled to the regulator. The switching circuit can be configured to discharge the ultracapacitor based at least in part on the output of the regulator. The switching circuit can include at least one semiconductor switching element operated in a hard switching manner during operation of the switching element.

16 Claims, 3 Drawing Sheets

(52) U.S. Cl.
CPC ............ *H02M 3/155* (2013.01); *H02J 7/0048* (2020.01); *H02J 7/345* (2013.01)

(58) Field of Classification Search
CPC ........ H02J 50/80; H02J 2207/20; H02J 3/381; H02J 50/10; H02J 50/70; H02J 7/025; H02J 2207/30; H02J 2300/20; H02J 2300/26; H02J 2300/28; H02J 2310/48; H02J 3/08; H02J 3/38; H02J 3/382; H02J 3/385; H02J 3/386; H02J 5/005; H02J 7/00; H02J 7/00047; H02J 7/0013; H02J 7/0018; H02J 7/0019; H02J 7/0029; H02J 7/0045; H02J 7/0047; H02J 7/007; H02J 7/007194; H02J 7/0091; H02J 7/06; H02J 7/35; H02J 7/0014; H02M 3/155
See application file for complete search history.

(56) References Cited

U.S. PATENT DOCUMENTS

| | | | |
|---|---|---|---|
| 6,806,686 B1 | 10/2004 | Thrap | |
| 6,943,529 B2 | 9/2005 | Cheiky et al. | |
| 7,042,197 B2 | 5/2006 | Turner et al. | |
| 7,342,768 B2 | 3/2008 | Doljack et al. | |
| 7,345,454 B2 | 3/2008 | Thrap | |
| 7,457,100 B2 | 11/2008 | Nakajima et al. | |
| 7,474,879 B2 | 1/2009 | Turner et al. | |
| 7,482,816 B2 | 1/2009 | Odajima et al. | |
| 7,531,987 B2 | 5/2009 | Ohasi et al. | |
| 7,599,167 B2 | 10/2009 | Doljack | |
| 7,599,168 B2 | 10/2009 | Doljack et al. | |
| 7,647,191 B2 | 1/2010 | Kakiuchi et al. | |
| 7,660,084 B2 | 2/2010 | Kim et al. | |
| 7,741,811 B2 | 6/2010 | Daio | |
| 7,880,449 B2 | 2/2011 | Thrap | |
| 7,969,121 B2 | 6/2011 | Smith et al. | |
| 8,134,337 B2 | 3/2012 | Morita | |
| 8,198,870 B2 | 6/2012 | Zuercher | |
| 8,305,035 B2 | 11/2012 | Morita et al. | |
| 8,411,413 B2 | 4/2013 | Eilertsen | |
| 8,463,562 B2 | 6/2013 | Nakanishi | |
| 8,686,662 B1 | 4/2014 | Bragg et al. | |
| 9,018,922 B2 | 4/2015 | Morita et al. | |
| 9,190,860 B2 | 11/2015 | Wright et al. | |
| 9,209,653 B2 | 12/2015 | Maynard et al. | |
| 9,515,510 B2 | 12/2016 | Newlin | |
| 9,525,298 B1 | 12/2016 | Pham | |
| 2002/0140405 A1 | 10/2002 | Malik | |
| 2005/0052169 A1* | 3/2005 | Thrap | H02J 7/345 323/282 |
| 2007/0216425 A1 | 9/2007 | Okamura et al. | |
| 2009/0009177 A1 | 1/2009 | Kim et al. | |
| 2009/0231764 A1 | 9/2009 | Banting et al. | |
| 2009/0322289 A1 | 12/2009 | Zuercher | |
| 2010/0039072 A1* | 2/2010 | Cegnar | H01G 9/155 320/167 |
| 2010/0079109 A1 | 4/2010 | Eilertsen et al. | |
| 2010/0283434 A1 | 11/2010 | Kakiuchi | |
| 2011/0075457 A1 | 3/2011 | Thrap | |
| 2012/0161710 A1 | 6/2012 | Mai et al. | |
| 2012/0176821 A1 | 7/2012 | Dunipace | |
| 2014/0114592 A1 | 4/2014 | Eilertsen | |
| 2015/0137217 A1* | 5/2015 | Wu | H01L 29/2003 257/329 |
| 2016/0036248 A1 | 2/2016 | Hamada | |
| 2016/0126826 A1 | 5/2016 | Chao | |
| 2016/0146173 A1 | 5/2016 | Mars et al. | |
| 2016/0243960 A1 | 8/2016 | Wood et al. | |
| 2016/0301221 A1 | 10/2016 | Kaminsky | |
| 2017/0338669 A1 | 11/2017 | Hansen | |

FOREIGN PATENT DOCUMENTS

| | | |
|---|---|---|
| JP | 5304654 | 10/2013 |
| JP | 2016-073046 | 5/2016 |
| KR | 100733394 | 6/2007 |
| KR | 100998661 | 12/2010 |
| KR | 100998661 B1 | 12/2010 |
| WO | WO 99/04476 | 1/1999 |
| WO | WO 2009-112069 | 9/2009 |
| WO | WO2009118119 | 10/2009 |
| WO | WO2009118120 | 10/2009 |
| WO | WO 2015/000017 A1 | 1/2015 |

OTHER PUBLICATIONS

Supplementary European Search Report for EP Application No. 18 83 5456, dated Oct. 22, 2020, 9 pages.

* cited by examiner

BALANCING CIRCUIT FOR AN ELECTRICAL ENERGY STORAGE DEVICE

PRIORITY CLAIM

The present application claims the benefit of priority of U.S. Provisional Patent Application Ser. No. 62/535,515, titled "Balancing Circuit for Electrical Energy Storage Device," filed on Jul. 21, 2017, which is incorporated herein by reference.

BACKGROUND

Electrical energy storage cells are widely used to provide power to electronic, electromechanical, electrochemical, and other useful devices. A double layer ultracapacitor, for instance, can employ a pair of polarizable electrodes that contain carbon particles (e.g., activated carbon) impregnated with a liquid electrolyte. Due to the effective surface area of the particles and the small spacing between the electrodes, large capacitance values can be achieved. The individual double layer capacitors may be combined together to form a module having a raised output voltage or increased energy capacity.

SUMMARY

One example aspect of the present disclosure is directed to a balancing circuit for an electrical energy storage cell, such as a double layer ultracapacitor. The balancing circuit can include a regulator having an input. The regulator can be configured to compare an input voltage associated with the electrical energy storage cell received at the input to a reference voltage and to provide an output via an output node. The balancing circuit can further include a switching circuit coupled to the regulator. The switching circuit can be configured to discharge the electrical energy storage cell based at least in part on the output of the regulator. The switching circuit can include at least one semiconductor switching element operated in a hard switching manner during operation of the switching element.

Other features and aspects of the present disclosure are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figure in which.

Repeat use of reference characters in the present specification and drawing is intended to represent same or analogous features or elements of the disclosure.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present disclosure, which broader aspects are embodied in the exemplary construction.

Example aspects of the present disclosure are directed to balancing circuits for use with electrical energy storage devices or cells, such as ultracapacitors. The balancing circuit can be used, for instance, to prevent overvoltage conditions from causing damage to the ultracapacitor. In some implementations, balancing circuits can help regulate the voltage across each ultracapacitor in an ultracapacitor module containing a plurality of ultracapacitors such that voltage across each ultracapacitor is regulated to substantially the same voltage.

In some embodiments, the balancing circuit for an ultracapacitor can include a regulator. The regulator can be configured to receive an input voltage associated with a voltage across the ultracapacitor and compare the input voltage with a reference voltage (e.g., a balance voltage for the ultracapacitor). The regulator can be any device that is operable to compare the input voltage with the reference voltage and provide an output. In some embodiments, the regulator can include a comparator and/or one or more switching elements provided in a single package (e.g., integrated circuit).

The input voltage can be any signal or voltage indicative of the voltage across the ultracapacitor. In some embodiments, the input voltage can be provided using a voltage divider circuit. The input voltage can be received at a sensing input of the regulator (e.g., via the voltage divider circuit).

The regulator can be configured to provide an output via an output node of the regulator based at least in part on the input voltage relative to the reference voltage. For instance, the regulator can be configured to provide a first output (e.g., a first logic output) via the output node when the input voltage is greater than the reference voltage. The regulator can be configured to provide a second output (e.g., a second logic output) via the output node when the voltage is associated with the ultracapacitor is not greater than the reference voltage.

The output of the regulator can be used to drive a switching circuit. The switching circuit can include one or more semiconductor switching elements, such as field effect transistors (e.g., MOSFETs). The switching elements can be operated in a fully saturated mode such that the switching elements are switched on and off in a hard switching manner. Hard switching can occur, for instance, when a semiconductor switching element is operated in a state such that the current through the switching element does not substantially increase or decrease despite a change in supply voltage. For example, hard switching can occur for a field effect transistor when the field effect transistor is operated in a saturation region such that a drain current does not increase despite an increase in the drain source voltage of the field effect transistor. This can allow the switching elements to accommodate higher currents associated with discharging ultracapacitors.

When the output of the regulator is a first output (e.g., the input voltage is greater than a reference voltage) the one or more switching elements in the switching circuit can be switched on (e.g., in a hard switching manner) so that current flows from the ultracapacitor through at least one of switching elements in the switching circuit to discharge the ultracapacitor, causing the voltage across the ultracapacitor to decrease. When the output of the regulator is a second output (e.g., the input voltage is less than a reference voltage) the one or more switching elements in the switching circuit can be switched off (e.g., in a hard switching manner) so that the ultracapacitor is charged causing the voltage associated with the ultracapacitor to increase. In this way, the balancing circuit can operate according to a switching mode regime where the ultracapacitor is charged until the voltage associated with the ultracapacitor exceeds a threshold and discharged until the voltage associated with the ultracapacitor falls below the threshold.

Example aspects of the present disclosure are discussed with reference to an ultracapacitor. Details concerning an example ultracapacitor are provided herein. Those of ordinary skill in the art, using the disclosures provided herein, will understand that balancing circuits according to example aspects of the present disclosure can be used in conjunction with other energy storage devices without deviating from the scope of the present disclosure, such as capacitors, batteries, and other electrical energy storage devices. The use of the term "about" in conjunction with a numerical value is intended to refer to within 20% of the stated amount.

One example embodiment of the present disclosure is directed to a balancing circuit for an energy storage device. The balancing circuit can include a regulator having an input. The regulator can be configured to compare an input voltage associated with the electrical energy storage device received at the input to a reference voltage and to provide an output via an output node. The balancing circuit can further include a switching circuit coupled to the regulator. The switching circuit can be configured to discharge the electrical energy storage device based at least in part on the output of the regulator. The switching circuit can include at least one semiconductor switching element operated in a hard switching manner during operation of the switching element.

In some embodiments, the balancing circuit is operable in a switching mode regime to charge and discharge the electrical energy storage device based at least in part on the reference voltage. During a switching regime, the electrical energy storage device can be switched back and forth between a discharging state and a not discharging state to maintain the voltage of the electrical energy storage device within a range or at a balance voltage.

For instance, in the switching mode regime, the at least one switching element of the switching circuit can be configured to be switching to a conducting state to discharge the electrical energy storage device when the output of the regulator is indicative of the voltage associated with the electrical energy storage device exceeding the reference voltage. In the switching mode regime, the at least one switching element can be configured to be switched to a non-conducting state to charge the electrical energy storage device when the output of the regulator is indicative of the voltage associated with the electrical energy storage device exceeding the reference voltage.

In some embodiments, the at least one semiconductor switching element includes a first field effect transistor and a second field effect transistor. A drain of the first field effect transistor can be coupled to a gate of the second field effect transistor. At least one of a source or a drain of the second field effect transistor can be coupled to the electrical energy storage device.

In some embodiments, the regulator can include at least one comparator configured to compare the input voltage with the reference voltage. The regulator can include one or more switching elements coupled to the comparator. The switching elements can be controlled by an output of the comparator to provide the output of the regulator.

In some embodiments, the balancing circuit includes a DC to DC converter coupled to the switching circuit. In some embodiments, the balancing circuit includes a notification circuit configured to provide an output signal indicative of the voltage associated with the electrical energy storage device exceeding the threshold voltage. The notification circuit can include a comparator circuit configured to compare the voltage associated with the electrical energy storage device with the reference voltage.

Another example aspect of the present disclosure is directed to a method of controlling a voltage of an ultracapacitor. The method can include receiving, at a first input of a regulator, a signal indicative of a voltage associated with an ultracapacitor. The method can include providing, via an output node of the regulator, an output signal used to drive a switching circuit coupled to the ultracapacitor. The method can include receiving, at the switching circuit, the at least one output signal. The method can include operating one or more switching elements in the switching circuit in a hard switching manner to charge or discharge the ultracapacitor based at least in part on the output signal.

In some embodiments, providing, via an output node of the regulator, an output signal used to drive a switching circuit coupled to the ultracapacitor can include providing, by the regulator, a first output when the voltage associated with the ultracapacitor is greater than a reference voltage and providing, by the regulator, a second output when the voltage associated with the ultracapacitor is not greater than the reference voltage.

In some embodiments, operating one or more switching elements in the switching circuit can include hard switching the one or more switching elements to a conducting state to discharge the ultracapacitor when the regulator provides the first output. In addition, operating one or more switching elements in the switching circuit can include switching the one or more switching elements to a non-conducting state to charge the ultracapacitor when the regulator provides the second output.

Another example aspect of the present disclosure is directed to a balancing circuit for an ultracapacitor. The balancing circuit can include a regulator having an input. The regulator can be configured to compare an input voltage associated with the ultracapacitor received at the input to a reference voltage and to provide an output via an output node. The balancing circuit can include a switching circuit. The switching circuit can include a first field effect transistor having a source, a drain, and a gate. The switching circuit can include a second field effect transistor having a source, a drain, and a gate. The output node of the regulator can be coupled to the gate of the first field effect transistor. The drain of the first field effect transistor can be coupled to the gate of the second field effect transistor. The source of the first field effect transistor can be coupled to the ultracapacitor.

In some embodiments, a DC to DC converter (e.g., a boost converter) can be coupled to the source of the first field effect transistor. For instance, the DC to DC converter can be coupled between the ultracapacitor and the source of the first field effect transistor. In some embodiments, the balancing circuit can further include a comparator configured to provide a notification signal indicative of the voltage associated with the ultracapacitor being greater than the reference voltage.

Figure 1:
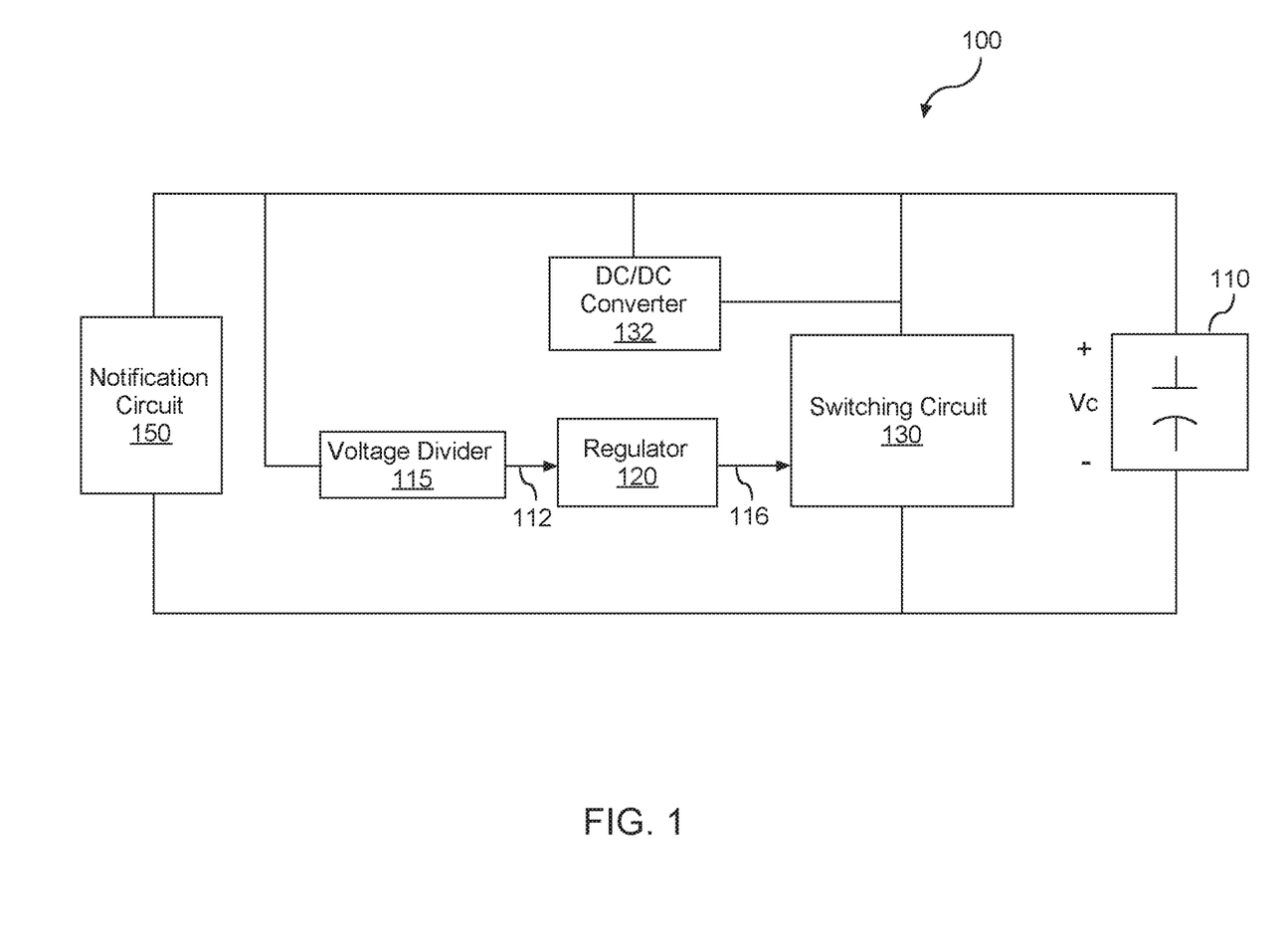
FIG. 1 depicts a block diagram of an example balancing circuit for an ultracapacitor according to example embodiments of the present disclosure.

The figures are provided for purposes of illustration and discussion of example embodiments of the present disclosure. FIG. 1 depicts a block diagram of an example balancing circuit 100 for use with an ultracapacitor 110 according to example embodiments of the present disclosure. The balancing circuit 100 includes a regulator 120. The regulator 120 can receive a signal 112 (e.g., input voltage) indicative of a voltage Vc across the capacitor via an input circuit, such as a voltage divider 115. The regulator 120 can compare the signal 112 with a reference voltage. In some embodiments, the reference voltage can be determined based a desired voltage at which the ultracapacitor 110 is to be maintained.

The regulator 120 can provide an output 116 based on the signal 112 indicative of the voltage Vc and the reference voltage. For instance, the regulator 120 can provide a first logic output (e.g., logic high) when the signal 112 indicative of the voltage Vc across the ultracapacitor 110 is greater than the reference voltage. The regulator 120 can provide a second logic output (e.g., logic low) when the signal 112 indicative of the voltage Vc across the ultracapacitor 110 is not greater than the reference voltage.

The output 116 can be provided to a switching circuit 130. The switching circuit 130 can include one or more semiconductor switching elements (e.g., field effect transistors). When the one or more switching elements are in a conducting state, the ultracapacitor 110 can discharge, reducing the voltage across the ultracapacitor 110. The ultracapacitor 110 can discharge until the signal 112 indicative of the voltage Vc across the ultracapacitor 110 is reduced low enough so that the signal 112 is no longer greater than the reference voltage. At this point, the switching elements can be controlled to be in a non-conducting state to charge the ultracapacitor 110. In this way, the balancing circuit 100 can be used to regulate the voltage of the ultracapacitor 110 and reduce overvoltage conditions using a switching mode regime. In a switching mode regime, the switching circuit is controlled to switch the ultracapacitor 110 back and forth between a discharging state and a not discharging state to maintain the voltage of the ultracapacitor 110 within a range or at a balance voltage.

In some embodiments, the semiconductor switching elements of the switching circuit 130 can be operated in a fully saturated mode to provide for hard switching of the switching elements. This can allow for the switching elements to accommodate the high currents from the ultracapacitor 110 during that can result from discharging the ultracapacitor 110 according to the switching mode regime.

A DC to DC converter 132 can be used to boost a DC voltage applied to the switching elements in the switching circuit to provide for improved performance of the semiconductor switching element when operating in, for instance, a fully saturated mode for hard switching of the semiconductor switching elements. The DC to DC converter can be coupled between the ultracapacitor 110 and the switching circuit 130.

The balancing circuit 100 can include a notification circuit 150. The notification circuit 150 can include a comparator. The comparator can compare the voltage associated with the ultracapacitor 110 with a threshold. If the voltage associated with the ultracapacitor 110 exceeds the threshold, the notification circuit 150 can provide a signal indicating that the voltage associated with the ultracapacitor 110 exceeds the threshold. This can be used to provide a notification (e.g., a visual indicator via a light emitting diode or other suitable notification.

Figure 2:
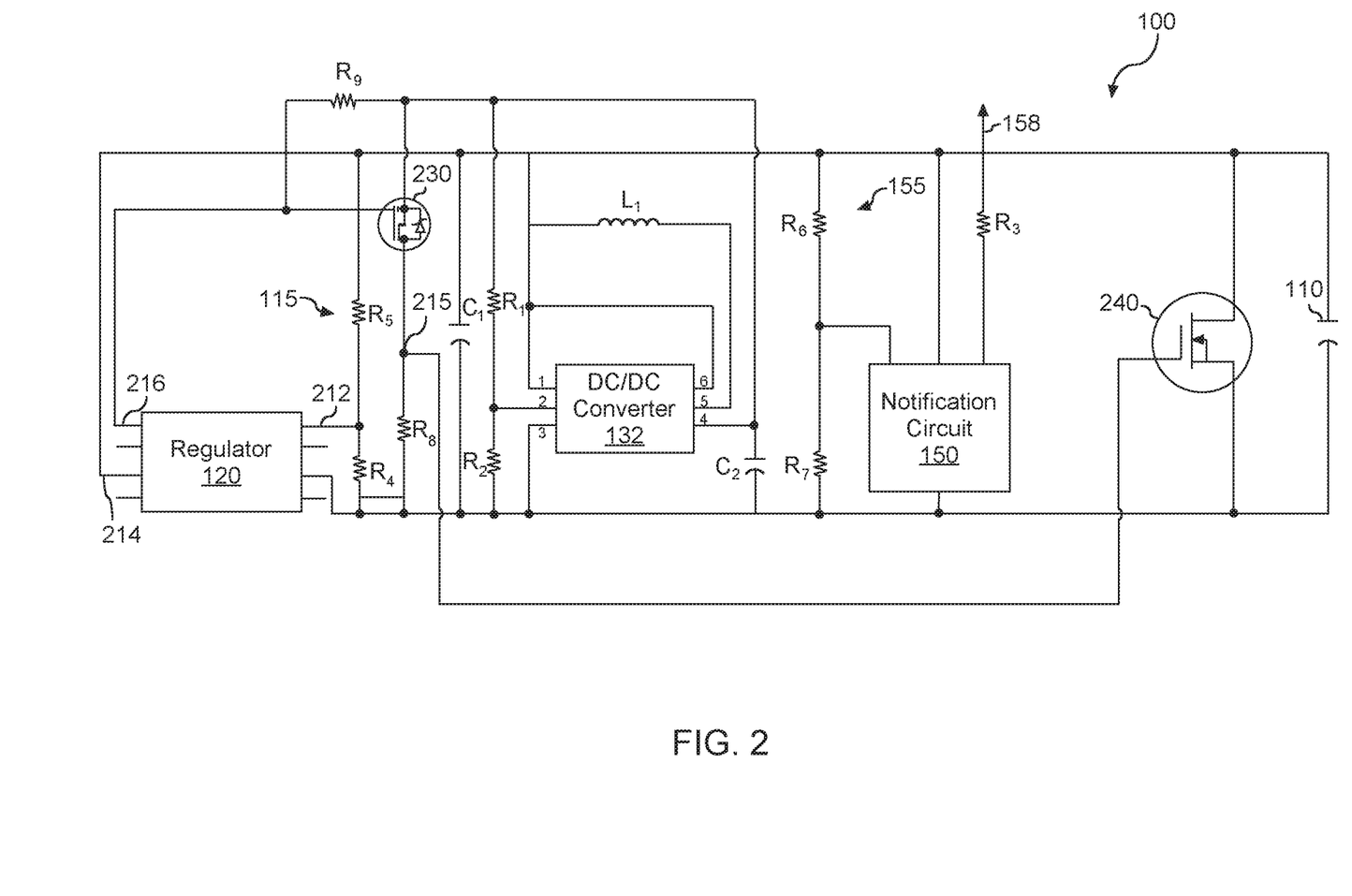
FIG. 2 depicts a circuit diagram of an example balancing circuit for an ultracapacitor according to example embodiments of the present disclosure.

FIG. 2 depicts a circuit diagram of an example implementation of the balancing circuit 100 according to example embodiments of the present disclosure. As shown, the balancing circuit 100 includes a voltage divider circuit 115, a regulator 120, and a switching circuit including FET switching elements 230 and 240. The balancing circuit 100 can be provided and configured using any method generally known in the art. In some embodiments, the balancing circuit 100 is provided on a circuit board (not shown), such as a printed circuit board.

The voltage divider circuit 115 can include a pair of resistors R4 and R5 coupled in series. A node 215 located between resistors R4 and R5 can be coupled input for regulator 120. The voltage at node 215 can be an input voltage associated with and indicative of the voltage across the ultracapacitor 110. The voltage at node 215 can be related to the voltage across the ultracapacitor 110 based on the resistance values of resistors R4 and R5.

The regulator 120, in some embodiments, can be an LT1431 regulator provided Linear Technology. The regulator 120 can provide a programmable reference voltage. The regulator 120 can be powered at least in part by a supply voltage at node 214. The regulator includes an input 212 and an output node 216. In some embodiments, the regulator 120 includes a comparator configured to compare a voltage associated with the ultracapacitor 110 received at input 212 and provide an output based on a comparison of the voltage associated with the ultracapacitor with a reference voltage (e.g., a programmable reference voltage). The regulator 120 can include one or more switching elements (e.g., transistors) configured to provide an output via the output node 216 based on the comparison. For instance, the regulator 120 can provide a first output (e.g., logic high) via output node 216 when the voltage associated with the ultracapacitor is greater than the reference voltage. The regulator 120 can provide a second output (e.g., logic low) via output node 216 when the voltage associated with the ultracapacitor is less than the reference voltage. The output can be provided to the switching circuit to drive semiconductor switching elements 230 and 240.

The switching circuit includes a first switching element 230, and a second switching element 240. The first switching element 230 is a field effect transistor having a gate, a source, and a drain. In some embodiments, the first switching element 230 can include, for instance, a BSP170P field effect transistor provided from Infineon. The second switching element 240 is a field effect transistor having a gate, a source, and a drain. In some embodiments, the second switching element 240 can include a BUZ347 field effect transistor provided from Siemens. The switching elements 230 and 240 can be operated in a fully saturated mode to provide for hard switching of the switching elements 230 and 240.

The output node 216 of the regulator 120 can be coupled to a gate of the first switching element 230. A drain of the first switching element 230 can be coupled to a gate of the second switching element 240. The second switching element 240 can be coupled in parallel with the ultracapacitor. A source of the second switching element 230 can be coupled to a first node associated with the ultracapacitor. A drain of the second switching element can be coupled to a second node associated with the ultracapacitor. The second switching element 240 can be mounted to a case associated with packaging the ultracapacitor 110 (e.g., an ultracapacitor module case) to be used as heat sink to dissipate heat associated with discharging of the ultracapacitor 110.

When the regulator 120 provides a first output (e.g., logic high) the first switching element 230 and the second switching element 240 are hard switched to a conducting state allowing discharge current to flow from the ultracapacitor 110. When the regulator 120 provides a second output (e.g., logic low) the first switching element 230 and the second switching element 240 are switched to a non-conducting state allowing the ultracapacitor to charge. In this way, the ultracapacitor 110 swings back and forth between a discharging state and a not discharging state by operating the balancing circuit 100 in a switching regime.

The balancing circuit 100 can include a DC to DC converter 132 to boost the voltage applied to a source of the first switching element 230. The DC to DC converter 132 can be, in some example embodiments, a TPS61222 boost converter provided by Texas Instruments. The DC to DC converter can include a first pin (Pin 1) for receiving an input voltage, a second pin (Pin 2) for receiving voltage feedback, a third pin (Pin 3) for connection to ground, a fourth pin (Pin 4) for providing a boosted voltage to the source of the first switching element 230, a fifth pin (Pin 5) for connection to inductor L1, and a sixth pin (Pin 6) for providing an enable input.

The balancing circuit can include a notification circuit 150 that includes a comparator used to determine when a voltage associated with the ultracapacitor exceeds a threshold voltage. In some embodiments, the notification circuit can be an LT6703 comparator from linear technology. The notification circuit 150 can receive a signal indicative of the voltage across the ultracapacitor 110 at an input from a voltage divider circuit 155 (e.g., R6 and R7 connected in series). The notification circuit can provide an output signal 156 when the voltage associated with the ultracapacitor exceeds the threshold voltage.

Table 1 below provides example values associated with circuit elements of the balancing circuit shown in FIG. 2. The values provided below are for example purposes.

TABLE 1

| Component | Value |
| --- | --- |
| R1 | About 1M Ohms |
| R2 | About 1M Ohms |
| R3 | About 1K Ohms |
| R4 | About 100k Ohms |
| R5 | About 10k Ohms |
| R6 | About 400k Ohms |
| R7 | About 62k Ohms |
| R8 | About 100k Ohms |
| R9 | About 100k Ohms |
| C1 | About 10 µF |
| C2 | About 10 µF |
| L1 | About 4.7 µH |

The balancing circuits according to example embodiments of the present disclosure can be used in conjunction with an ultracapacitor module containing a plurality of ultracapacitors coupled in series or parallel. Any number of balancing circuits may be employed according to the present disclosure. For instance, the module contains at least one balancing circuit and in some embodiments at least two balancing circuits. However, it should be understood that the module may contain more balancing circuits. For instance, the module may contain 4 or more, such as 6 or more, such as 8 or more, and in some embodiments, from 8 to 30 individual balancing circuits. In some embodiments, there is at least one balancing circuit per ultracapacitor.

Figure 3:
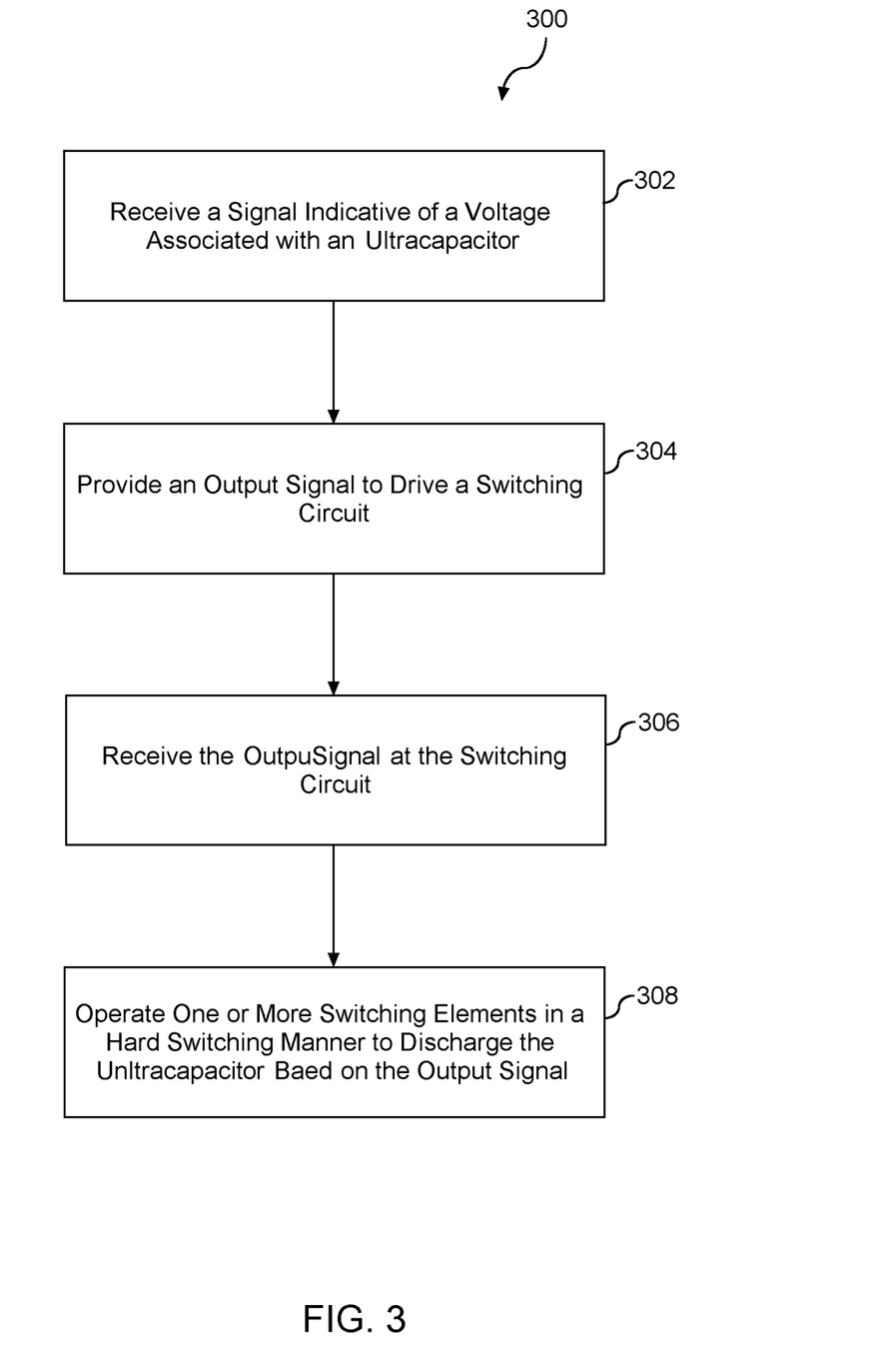
FIG. 3 depicts a flow diagram of an example method according to example embodiments of the present disclosure.

FIG. 3 depicts a flow diagram of an example method (300) according to example embodiments of the present disclosure. The method (300) can be implemented, for instance, using the balancing circuit depicted in FIGS. 1 and 2. FIG. 3 depicts steps performed in a particular order for purposes of illustration and discussion. Those of ordinary skill in the art, using the disclosures provided herein, will understand that various steps of any of the methods disclosed herein can be omitted, rearranged, performed simultaneously, expanded, modified, and/or adapted in various ways without deviating from the scope of the present disclosure.

At (302), the method includes receiving, at a first input of a regulator, a signal indicative of a voltage associated with the ultracapacitor. For instance, the regulator 120 of FIG. 2 can receive an input voltage at input 212. In some embodiments, the signal indicative of the voltage associated with the ultracapacitor is an input voltage provided via a voltage divider.

At (304) of FIG. 3, the method includes providing, via an output node of the regulator, an output signal used to drive a switching circuit coupled to the ultracapacitor. For instance, the regulator 120 of FIG. 2 can provide an output signal to gate of switching element 230 via output node 216. The output signal can be determined based at least in part on a comparison of the signal indicative of the voltage associated with the ultracapacitor and a reference voltage. For instance, a first output can be provided when the signal indicative of the voltage associated with the ultracapacitor exceeds the reference voltage. A second output can be provided when the signal indicative of the voltage associated with the ultracapacitor does not exceed the threshold.

At (306) of FIG. 3, the method includes receiving the output signal at the switching circuit. For instance, the gate of switching element 230 of FIG. 2 can receive the output signal from regulator 120.

At (308) of FIG. 3, the method can include operating switching elements in the switching circuit in a hard switching manner to charge or discharge the ultracapacitor based at least in part on the output signal. For instance, when the regulator 120 of FIG. 2 provides a first output (e.g., logic high), the first switching element 230 and the second switching element 240 are hard switched to a conducting state allowing discharge current to flow from the ultracapacitor 110. When the regulator 120 provides a second output (e.g., logic low) the first switching element 230 and the second switching element 240 are switched to a non-conducting state allowing the ultracapacitor to charge.

Any of a variety of different individual ultracapacitors may generally be employed in the module according to example aspects of the present disclosure. IN some embodiments, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present disclosure. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.), and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); alum inates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present disclosure. The metal container may have any of a variety of different shapes, such as cylindrical, D-shaped, etc. Cylindrically-shaped containers are particular suitable.

Any suitable connection between the ultracapacitors can be employed in accordance with example aspects of the present disclosure. For example, the ultracapacitors may be connected using an interconnect that attaches to or connects the respective terminals of the ultracapacitors. The interconnect may be made of a conductive material, such as a conductive metal. In one embodiment, the interconnect may be relatively flat or may be one having an increased surface area. Regarding the latter, the interconnect may have projections/protrusions or may also be formed from wires, braids, coils, etc. In this regard, the specific dimensions and configuration of the interconnects is not necessarily limited. Regardless of its form, any of a variety of different conductive materials may be employed, such as copper, tin, nickel, aluminum, etc., as well as alloys and/or coated metals. If desired, the conductive material may optionally be insulated with a sheath material.

The ultracapacitors may be electrically connected together in series or in parallel, depending on the particular properties desired. For instance, in one particular embodiment, the ultracapacitors may be electrically connected in series such that a terminal of a certain polarity (e.g., positive) of one ultracapacitor is connected to a terminal of opposite polarity (e.g., negative) of another ultracapacitor. For instance, the positive terminal may extend from a top portion of the first ultracapacitor and the negative terminal may extend from a bottom portion of the second ultracapacitor.

Ultracapacitors and modules containing them can be employed to store large amounts of electrical charge. As a result, the modules and ultracapacitors of the present disclosure can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). They also have a variety of applications in consumer electronics (e.g., portable media players, hand-held devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

What is claimed is:

1. A balancing circuit for an electrical energy storage device, the balancing circuit comprising:
   a regulator comprising an input, the regulator configured to compare an input voltage associated with the electrical energy storage device received at the input to a reference voltage and to provide an output via an output node;
   a switching circuit coupled to the regulator, wherein the switching circuit is configured to discharge the electrical energy storage device based at least in part on the output of the regulator, the switching circuit comprising at least one semiconductor switching element configured to be operated in a hard switching manner during operation of the switching element, wherein the at least one semiconductor switching element is configured to be operated in a fully saturated mode when the at least one semiconductor switching element is operated in the hard switching manner,
   wherein when the input voltage is greater than the reference voltage, the output comprises a first logic output to switch the at least one semiconductor switching element to a conducting state to discharge the electrical energy storage device, and
   wherein when the input voltage is not greater than the reference voltage, the output comprises a second logic output that is different than the first logic output to switch the at least one semiconductor switching element to a non-conducting state to stop discharging the electrical energy storage device.

2. The balancing circuit of claim 1, wherein the at least one semiconductor switching element comprises a first field effect transistor and a second field effect transistor.

3. The balancing circuit of claim 2, wherein a drain of the first field effect transistor is coupled to a gate of the second field effect transistor.

4. The balancing circuit of claim 2, wherein at least one of a source and a drain of the second field effect transistor is coupled to the electrical energy storage device.

5. The balancing circuit of claim 2, wherein the second field effect transistor is mounted to a case associated with packaging of the electrical energy storage device.

6. The balancing circuit of claim 1, wherein the regulator comprises at least one comparator configured to compare the input voltage with the reference voltage.

7. The balancing circuit of claim 6, wherein the regulator comprises one or more switching elements coupled to the comparator, the one or more switching elements of the regulator controlled by an output of the comparator to provide the output of the regulator via the output node.

8. The balancing circuit of claim 1, wherein the balancing circuit comprises a DC to DC converter coupled to the switching circuit.

9. The balancing circuit of claim 1, wherein the balancing circuit comprises a notification circuit configured to provide an output signal indicative of the voltage associated with the electrical energy storage device exceeding the reference voltage.

10. The balancing circuit of claim 9, wherein the notification circuit comprises a comparator circuit configured to compare the voltage associated with the electrical energy storage device with the reference voltage.

11. A method of controlling a voltage of an ultracapacitor, the method comprising:
  receiving, at a first input of a regulator, a signal indicative of a voltage associated with an ultracapacitor;
  providing, via an output node of the regulator, a first logic output as an output signal when the voltage associated with the ultracapacitor is greater than a reference voltage;
  providing, via the output node of the regulator, a second logic output as the output signal when the voltage associated with the ultracapacitor is not greater than the reference voltage, the second logic output being different than the first logic output;
  receiving the output signal at a switching circuit; and
  responsive to receiving the output signal, operating one or more switching elements in the switching circuit in a hard switching manner while the one or more switching elements are in a fully saturated mode to discharge the ultracapacitor based at least in part on the output signal.

12. The method of claim 11, wherein when the output signal comprises the first logic output, operating one or more switching elements in the switching circuit comprises hard switching the one or more switching elements to a conducting state to discharge the ultracapacitor.

13. The method of claim 11, wherein when the output signal comprises the second logic output, operating one or more switching elements in the switching circuit comprises switching the one or more switching elements to a non-conducting state to stop discharging the ultracapacitor.

14. A balancing circuit for an ultracapacitor, the balancing circuit comprising:
  a regulator having an input, the regulator configured to compare an input voltage associated with the ultracapacitor received at the input to a reference voltage and to provide an output via an output node;
  a switching circuit, thy: switching circuit comprising:
    a first field effect transistor having a source, a drain, and a gate;
    a second field effect transistor having a source, a drain; and a gate
    wherein the output node of the regulator is coupled to the gate of the first field effect transistor, wherein the drain of the first field effect transistor is coupled to the gate of the second field effect transistor, wherein the source of the first field effect transistor is coupled to the ultracapacitor,
  wherein when the input voltage is greater than the reference voltage, the output comprises a first logic output to switch at least the first field effect transistor to a conducting state to discharge the ultracapacitor, and
  wherein when the input voltage is not greater than the reference voltage, the output comprises a second logic output that is different than the first logic output to switch at least the first field effect transistor to a non-conducting state to stop discharging the ultracapacitor.

15. The balancing circuit of claim 14, wherein a DC to DC converter is coupled to the source of the first field effect transistor.

16. The balancing circuit of claim 14, wherein the balancing circuit further comprises a comparator configured to provide a notification signal indicative of the voltage associated with the ultracapacitor being greater than the reference voltage.

* * * * *